(12) United States Patent
Saeki

(10) Patent No.: US 6,378,585 B1
(45) Date of Patent: Apr. 30, 2002

(54) HEAVY DUTY PNEUMATIC TIRE AND METHOD OF MANUFACTURING THE SAME

(75) Inventor: Tsutomu Saeki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/468,076

(22) Filed: Dec. 21, 1999

(30) Foreign Application Priority Data

Dec. 21, 1998 (JP) .......................................... 10-362034

(51) Int. Cl.[7] .......................... B60C 15/05; B29D 30/32
(52) U.S. Cl. ...................... 152/540; 152/545; 152/552; 152/554; 156/132; 156/135; 156/136
(58) Field of Search ................................. 152/539, 540, 152/545, 548, 550, 552, 554; 156/131–133, 135, 136, 117

(56) References Cited

U.S. PATENT DOCUMENTS

| | | |
|---|---|---|
| 3,392,773 A | 7/1968 | Warren et al. |
| 4,964,452 A | 10/1990 | Harrison et al. |
| 5,114,512 A | 5/1992 | Holroyd et al. |
| 5,849,117 A * | 12/1998 | Billieres .................... 152/539 |
| 5,885,387 A * | 3/1999 | Ueyoko ....................... 152/540 |

FOREIGN PATENT DOCUMENTS

| | | | |
|---|---|---|---|
| EP | 467277 A1 * | 1/1992 | ................ 152/545 |
| EP | 748 287 B1 | 12/1996 | |
| GB | 2179009 | 2/1987 | |
| GB | 2033311 | 5/1990 | |
| JP | 58-105806 A * | 6/1983 | ................ 152/545 |
| JP | 10-305710 | 11/1998 | |

OTHER PUBLICATIONS

Patent Abstracts of Japan, V18, N479, JP 6–156022, Jun. 3, 1994.

* cited by examiner

Primary Examiner—Geoffrey L. Knable
(74) Attorney, Agent, or Firm—Sughrue Mion, PLLC

(57) ABSTRACT

A heavy duty pneumatic tire comprises a carcass toroidally extending between a pair of bead cores embedded in bead portions and comprised of at least one rubberized carcass ply, wherein the carcass ply is wound around the bead core from an inside of the tire toward an outside thereof in a radial direction so as to locate a turnup portion in a zone of a bead portion contacting with a rim, and a turnup portion of the carcass ply is sandwiched between winding wires.

9 Claims, 5 Drawing Sheets

HEAVY DUTY PNEUMATIC TIRE AND METHOD OF MANUFACTURING THE SAME

BACKGROUND OF THE INVENTION

1. Field of the Invention

This invention relates to a heavy duty pneumatic tire and a method of manufacturing the same, and more particularly to a heavy duty pneumatic tire capable of sufficiently removing a fear of causing pull-out of carcass ply cord and advantageously preventing the occurrence of separation failure at a turnup portion of the carcass ply by improving a structure of a bead portion.

2. Description of Related Art

In the usual heavy duty pneumatic radial tire, in order to prevent the pull-out of the carcass ply cord during the running of the tire under loading, the turnup portion of the carcass ply wound around a bead core from an inside of the tire toward an outside thereof is largely turned outward in the radial direction of the tire and strongly fastened by embedding in rubber.

In such a conventional technique, the turnup end of the carcass ply is located outward from a contact area of the bead portion with a rim in the radial direction of the tire, so that a part of the bead portion or a sidewall portion near to the turnup end is repeatedly subjected to fall-down deformation outward in the widthwise direction of the tire at an outer circumferential side separated away from a rim flange, which is different from an inner end part of the bead portion in the radial direction strongly held by the rim and strongly reinforced with a bead core, a bead filler and the like. As a result, the turnup end of the carcass ply is repeatedly subjected to stress, whereby it is apt to cause separation of the turnup end from rubber and hence there is caused a fear of growing the separation along the turnup portion of the carcass ply.

SUMMARY OF THE INVENTION

It is, therefore, an object of the invention to solve the afore-mentioned problem of the conventional technique and to provide a heavy duty pneumatic tire having a bead portion structure capable of sufficiently preventing the pull-out of the carcass ply cord and effectively preventing the occurrence of separation failure at the turnup end of the carcass ply as well as a method of manufacturing the same.

According to a first aspect of the invention, there is the provision of a heavy duty pneumatic tire comprising a carcass toroidally extending between a pair of bead cores embedded in bead portions and comprised of at least one rubberized carcass ply, wherein the carcass ply is wound around the bead core from an inside of the tire toward an outside thereof in a radial direction so as to locate a turnup portion in a zone of a bead portion contacting with a rim, and a turnup portion of the carcass ply is sandwiched between winding wires.

The term "zone of the bead portion contacting with the rim" used herein means a maximum contacting zone of the bead portion with the rim during the running of the tire under loading.

In such a tire, the turnup end of the carcass ply is located at a position of contacting the bead portion with an outer peripheral edge of a rim flange or inside thereof in the radial direction of the tire, whereby the deformation of the bead portion in the vicinity of the turnup end during the running of the tire under loading is effectively controlled by the rim and a bead portion reinforcing member and hence concentration of stress in the turnup end of the carcass ply, repetitive application of stress thereto and the like can effectively be prevented to advantageously control the separation failure in the turnup end and hence the turnup portion.

On the other hand, the pull-out of the carcass ply cord resulted from tensile force applied thereto can sufficiently be prevented by a restraining force of winding wires sandwiching the turnup portion therebetween.

In a preferable embodiment of the invention, the end part of the turnup portion of the carcass ply wound around the bead core, or a part excluding a turnup base portion is extended outward in a widthwise direction of the tire.

Thus, the turnup end can be located at a place being less in the deformation of the bead portion as compared with a case that the turnup portion is turned outward in the radial direction of the tire, whereby the occurrence of separation failure can be prevented more advantageously.

In this case, a length of the turnup end part is favorably within a range of 15–25 mm. When the length is less than 15 mm, it is difficult to enhance the resistance to the pull-out of the carcass ply cord, while when it exceeds 25 mm, the thickness of the bead portion becomes excessively thick and rapid bending of the turnup portion of the carcass ply wound around the bead core can not be avoided at a place separated outward from the vicinity of the bead core in the widthwise direction of the tire and hence there is a fear of causing the concentration of stress in such a place.

Since the turnup end part is extended outward in the widthwise direction of the tire, it is easy to sandwich the turnup end part between the winding wires and the function inherent to the winding wire can sufficiently be developed.

The winding wire is favorable to be formed by winding a rubberized strip of about 5 mm in width containing plural wires extended in parallel to each other therein. In this case, the handling of the wire is easy and the winding operation is improved.

Furthermore, it is favorable that the bead core is made of the same material as the winding wire. Thus, the production coat can be reduced as compared with the case that the bead core is made of a material different from that of the winding wire.

According to a second aspect of the invention, there is the provision of a method manufacturing a heavy duty pneumatic tire which comprises a step of winding an innerliner rubber and a carcass ply on a shaping drum to form a cylindrical band, a step of setting a pair of bead cores to both side end portions of the band, and a step of sandwiching an end portion of the carcass ply projected outward from the bead core by winding ore or more wires on inner and outer peripheral sides of the end portion in a radial direction of the drum.

Thus, the projected end portion of the carcass ply is closely sandwiched between the winding wire at a given force, so that the projected end portion corresponding to an end part of a turnup portion of the carcass ply in a product tire can be fastened at a strength as is expected.

In this method, the projected end portion of the carcass ply may be sandwiched with a wire ring formed by previously winding a wire from inner and outer peripheral sides in the radial direction. Thus, the sandwiching of the projected end portion can be realized simply and rapidly.

And also, the projected end portion may be sandwiched with the wire ring formed by previously winding the wire and by winding one or more wires from inner and outer peripheral sides in the radial direction, wherein the wire ring is arranged at either one of the inner and outer peripheral sides. In this case, the merits using the winding of the wire and the wire ring can simultaneously be obtained.

Moreover, the pair of the bead cores can be formed by winding of the wire.

BRIEF DESCRIPTION OF THE DRAWINGS

The invention will be described with reference to the accompanying drawings, wherein.

DESCRIPTION OF PREFERRED EMBODIMENTS

Figure 1:
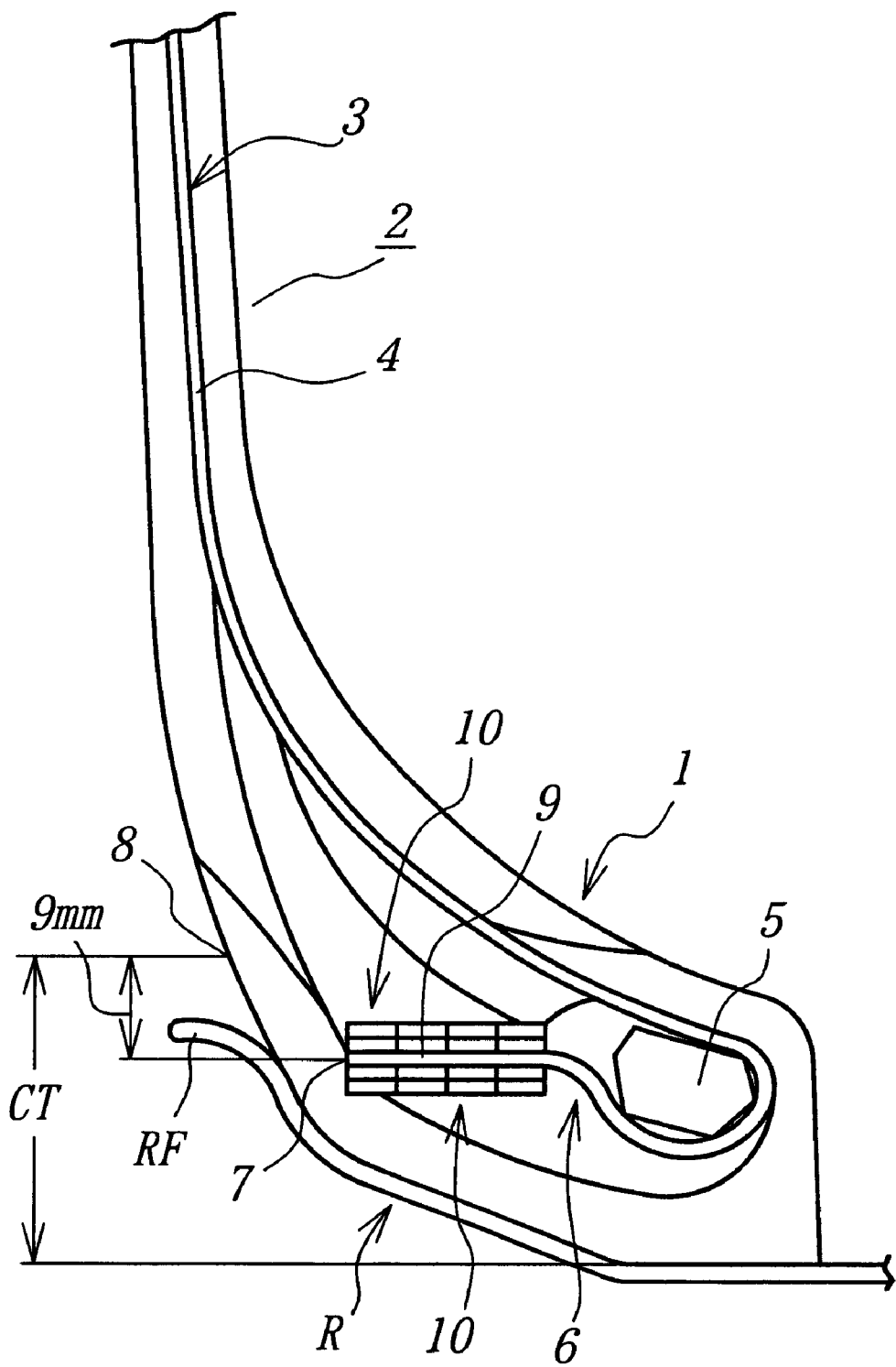
FIG. 1 is a diagrammatically section view of a main part of a first embodiment of the heavy duty pneumatic tire according to the invention.

In FIG. 1 is sectionally shown a main part of a first embodiment of the heavy duty pneumatic tire according to the invention, wherein numeral 1 is a bead portion located at an innermost peripheral side in a radial direction of the tire, numeral 2 a sidewall portion continuously extending outward from the bead portion 1 in the radial direction, and numeral 3 a carcass constituting a skeleton structure of the tire.

The carcass 3 is comprised of at least one carcass ply 4 (usually plural carcass plies), which is wound around a bead core 5 embedded in an inner end part of the respective bead portion 1 in the radial direction from an inside toward an outside in a widthwise direction of the tire to form a turnup portion 6. A turnup end 7 of the turnup portion 6 is located in a zone CT of the bead portion 1 contacting with a rim R in the radial direction of the tire. In this case, an outer peripheral edge position 8 of the bead portion 1 contacting with the rim R is an outermost peripheral side position of the bead portion 1 contacting with a rim flange RF during the running of the tire under loading.

Preferably, an end part 9 of the turnup portion 6 or neighborhood of the turnup end 7 is extended substantially in parallel to an axial line of the tire at section of the illustrated embodiment outward in the widthwise direction of the tire, preferably at a length of 15–25 mm at a state of sufficiently enveloping the bead core 5 with the turnup portion 6, and strongly sandwiched between winding wires 10 from inner and outer peripheral sides in the radial direction.

Figure 2A:
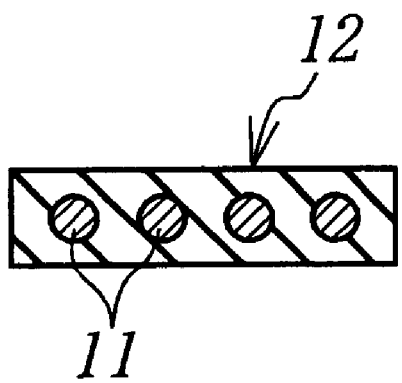
FIG. 2 is a schematic view of an embodiment of the winding wire according to the invention.
Figure 2B:
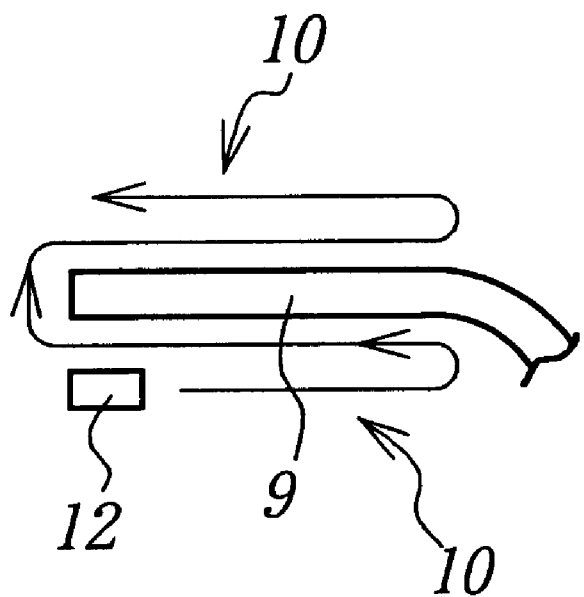

The sandwiching of the turnup end part 9 between the winding wires 10 is carried out by helically winding one or more rubberized wires at the inner peripheral side of the end part 9 therealong given times and stages and then winding at the outer peripheral side of the end part 9 in the same manner as described above. Alternatively, a strip 12 of, for example, 5 mm in width formed by rubberizing plural wires extended in parallel to each other, for example, four wires 11 as shown by a lateral section in FIG. 2a may be wound onto the end part 9 as shown by a detoured arrow in FIG. 2b, whereby the working efficiency can be more improved.

Figure 3A:
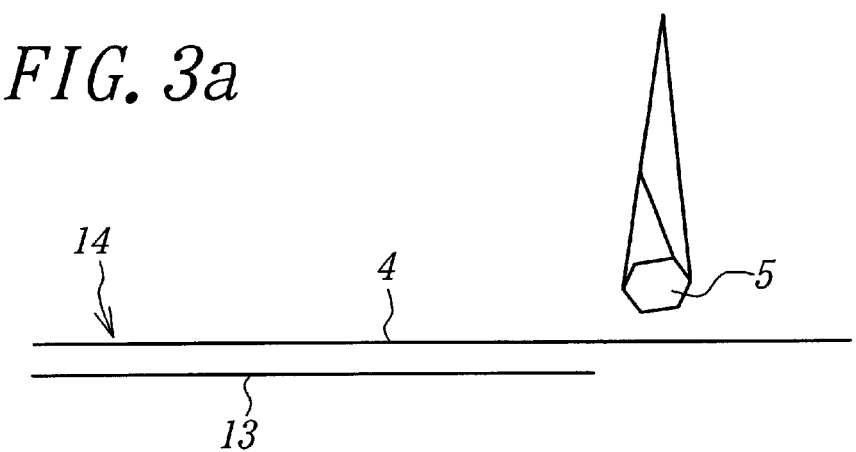
FIGS. 3a to 3d are schematic views illustrating an embodiment of shaping a bead portion, respectively.
Figure 3B:
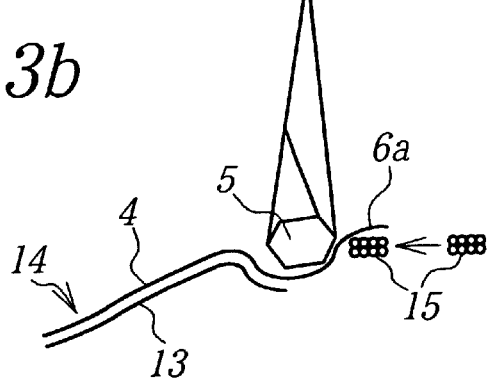
Figure 3C:
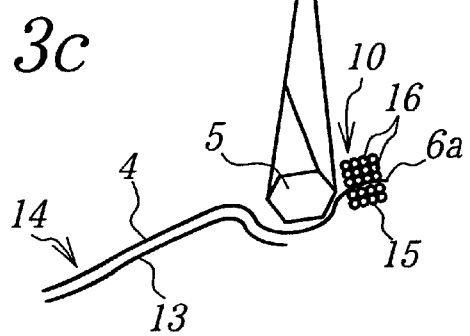
Figure 3D:
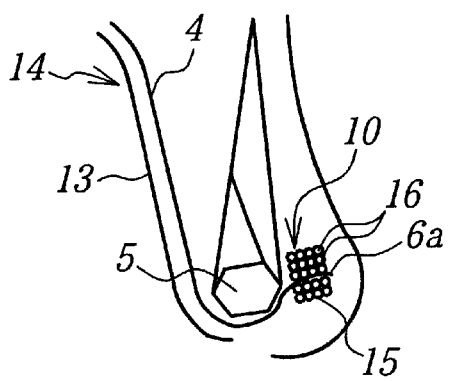

In the building of the tire having such a bead portion structure, an innerliner 13 and a carcass ply 4 are wound on a shaping drum (not shown) to form a cylindrical band 14 as schematically shown in FIG. 3a, and a bead core 5 is set onto the respective side end part of the band 14 based on the local enlargement of the shaping drum and a wire ring 15 formed by previously winding the wire is fitted onto an inner peripheral side of an end part 6a of carcass ply 4 projected outward from the bead core 5 as shown in FIG. 3b, while one or more rubberized wires 16 are helically wound on an outer peripheral side of the end part 6a therealong given times and stages under a given tensile force as shown in FIG. 3c, whereby the end part 6a is sufficiently and strongly sandwiched between the winding wire 10 and the wire ring 15, and thereafter the innerliner 13 and the carcass ply 4 are expanded to a given outer profile as shown in FIG. 3d for subjecting to various subsequent shaping treatments.

Figure 4:
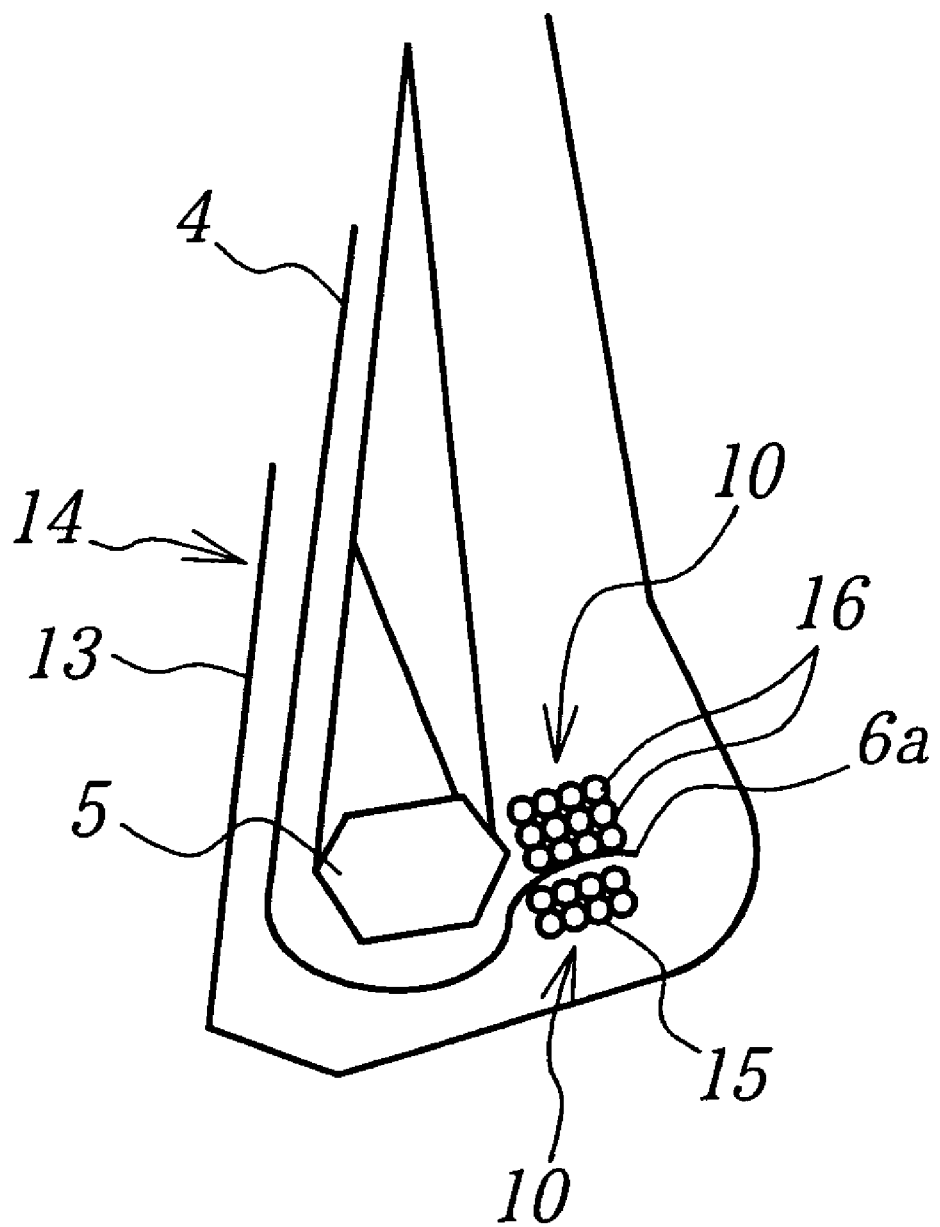
FIG. 4 is a schematic view illustrating a bead portion after the shaping.

The bead portion after such a shaping is sectionally shown in FIG. 4.

Figure 5:
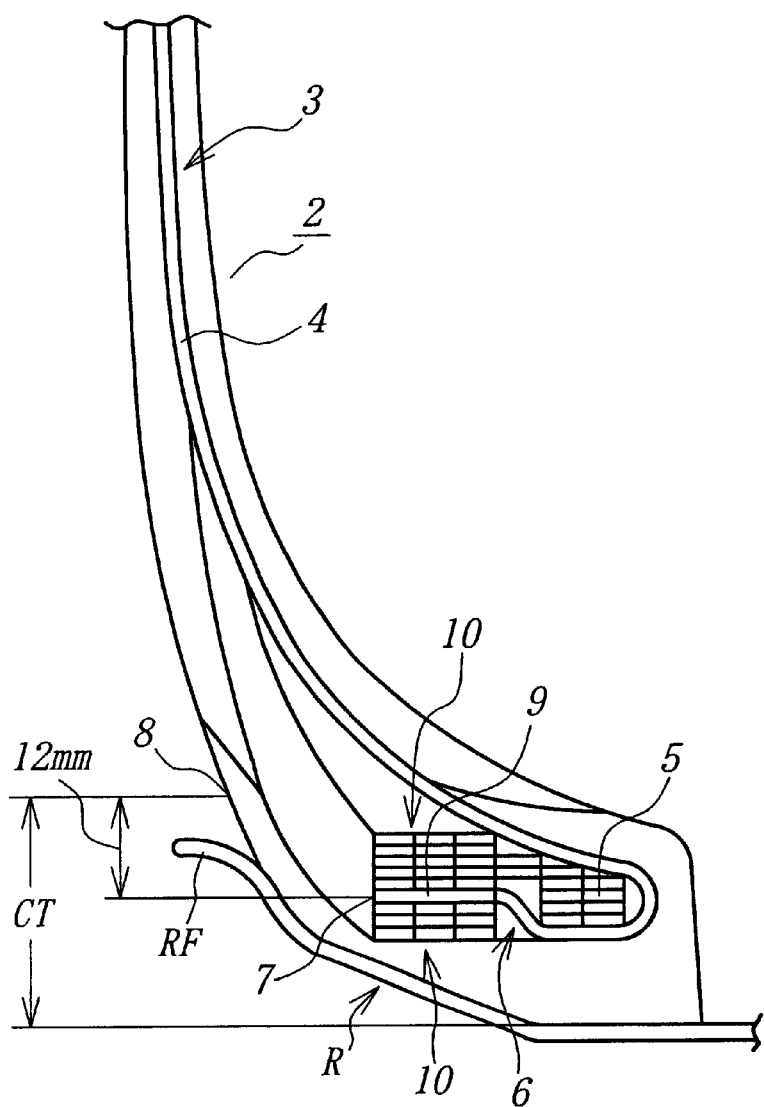
FIG. 5 is a diagrammatically section view of a main part of a second embodiment of the heavy duty pneumatic tire according to the invention.

In FIG. 5 is sectionally shown a second embodiment of the heavy duty pneumatic tire according to the invention, wherein the bead core 5 is made of the same material as the winding wire 10.

Figure 6:
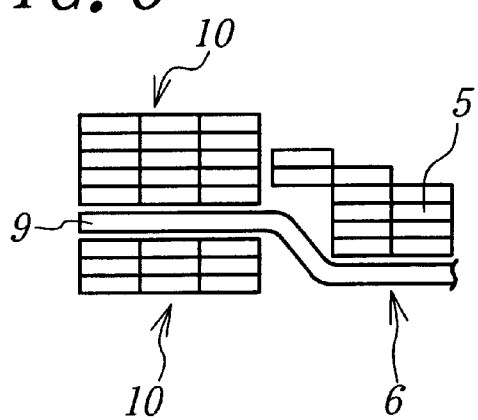
FIG. 6 is a schematic view illustrating the formation of a bead core and a winding wire.

As shown in FIG. 6, the above bead portion structure can be realized by forming the bead core 5 on the end portion of the carcass ply 4 and subsequently forming the winding wires 10 at the inner and outer peripheral sides of the end part 9 of the turnup portion of the carcass ply 4.

In any case, the turnup portion 6 of the carcass ply 4 is sufficiently and strongly sandwiched between the winding wires 10 and the like, whereby the length of the turnup portion 6 can be made shorter than that in the conventional technique and a fear of causing the pull-out of the carcass ply cord can sufficiently removed. And also, the turnup end 7 is located in the zone CT of the bead portion 1 contacting with the rim R in the radial direction of the tire, whereby the deformation of the bead portion 1 in the vicinity of the turnup end during the running of the tire under loading can effectively be prevented in cooperation with the winding wire 10 having a high stiffness to effectively control the occurrence of separation failure at the turnup end 7.

The following examples are given in illustration of the invention and are not intended as limitations thereof.

There are provided tires of Examples 1–2 and Comparative Examples 1–2 having a tire size of 11R22.5. The tire of Example 1 has a structure and dimension shown in FIG. 1, and the tire of Example 2 has a structure and dimension shown in FIG. 5, while the tires of Comparative Examples 1 and 2 have the structure shown in FIG. 1 except that the winding wire 10 is removed and a turnup end 7 of the carcass ply is located outward by 12 mm or inward by 10 mm from the outer peripheral edge position 8 of the bead portion 1 in the radial direction.

With respect to these tires, a drum test for the durability of the bead portion and a water pressure sealing test are carried out for evaluating resistance to separation failure at the turnup end of the carcass ply and resistance to pull-out of the carcass ply cord to obtain results as shown in Table 1.

The drum test for the durability of bead portion is carried out by setting the tire mounted onto a recommended rim and inflated under a maximum air pressure onto a drum and running at a speed of 60 km/h to measure a running distance until the occurrence of trouble in the bead portion, and the water pressure sealing test is carried out by gradually increasing pressure of water filled in the tire to measure water pressure until the occurrence of pulling out the cord. These properties are represented by an index on the basis that Comparative Example 1 is 100, wherein the larger the index value, the better the property.

TABLE 1

|  | Bead portion durability | Resistance to pull-out of cord |
|---|---|---|
| Comparative Example 1 | 100 | 100 |
| Comparative Example 2 | 115 | 35 |
| Example 1 | 125 | 100 |
| Example 22 | 120 | 100 |

As seen from Table 1, the tires according to the invention can develop an excellent bead portion durability while maintaining the resistance to pull-out of cord at a sufficiently high level.

As mentioned above, according to the invention, the occurrence of separation failure at the turnup end of the carcass ply can effectively be prevented while sufficiently controlling the pull-out of the carcass ply cord.

What is claimed is:

1. A heavy duty pneumatic tire comprising; a carcass toroidally extending between a pair of bead cores embedded in bead portions, said carcass comprised of at least one rubberized carcass ply wound around the bead core from an inside of the tire toward an outside in a widthwise direction of the tire to place a turn-up end of the carcass ply extended outward from the bead core in a region corresponding to a position of the bead portion to be contacted with a rim flange in a radial direction, and a turnup portion of the carcass ply is extended outward from the bead core in the widthwise direction of the tire and is sandwiched between wires of wire rings on an outer side of said bead core in the widthwise direction of said tire.

2. A heavy duty pneumatic tire according to claim 1, wherein the turn-up end part of the turnup portion has a length of 15–25 mm.

3. A heavy duty pneumatic tire according to claim 1, wherein the turnup end portion is sandwiched between said wires of said wire rings.

4. A heavy duty pneumatic tire according to claim 1, wherein the winding rings are formed by winding a rubberized strip containing plural wires extended in parallel to each other therein.

5. A heavy duty pneumatic tire according to claim 1, wherein the bead core is made of the same continuous wire material as the wire rings.

6. A method manufacturing a heavy duty pneumatic tire comprising the steps of:

winding an innerliner rubber and a carcass ply on a shaping drum to form a cylindrical band, setting a pair of bead cores to both side end portions of the band, and sandwiching an end portion of the carcass ply projected outward from the bead core in the widthwise direction of the tire by winding one or more wires on inner and outer peripheral sides of the end portion in a radial direction of the drum.

7. The method according to claim 6, wherein the bead core is formed by winding of the same wire used to sandwich the end portion of the carcass ply.

8. A method manufacturing a heavy duty pneumatic tire comprising the steps of:

winding an innerliner rubber and a carcass ply on a shaping drum to form a cylindrical band, setting a pair of bead cores to both side end portions of the band, and sandwiching an end portion of the carcass ply projected outward from the bead core in the widthwise direction of the tire with a preformed wire ring that is formed by winding a wire and is fitted onto inner and outer peripheral sides of the end portion in a radial direction.

9. A method manufacturing a heavy duty pneumatic tire comprising the steps of:

winding an innerliner rubber and a carcass ply on a shaping drum to form a cylindrical band, setting a pair of bead cores to both side end portions of the band, and sandwiching an end portion of the carcass ply projected outward from the bead core in the widthwise direction with a at preformed wire ring that is formed by winding the wire and is fitted either one of the inner and outer peripheral sides of the end portion and by winding one or more wires at the remaining side.

* * * * *